W. H. MORSE.
LOAD SUSTAINING DEVICE.
APPLICATION FILED MAY 27, 1916.
1,209,746.
Patented Dec. 26, 1916.
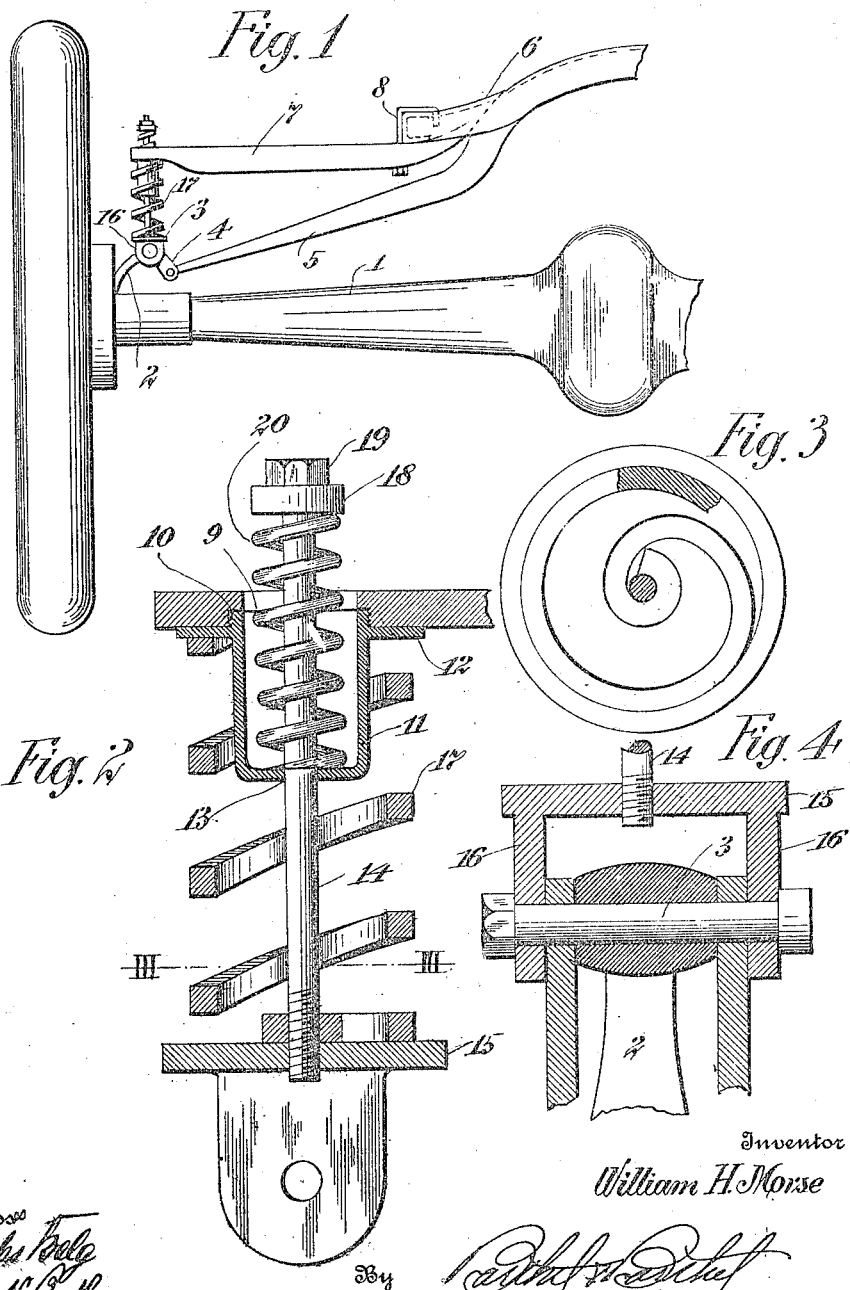
Inventor
William H. Morse

UNITED STATES PATENT OFFICE.

WILLIAM H. MORSE, OF DETROIT, MICHIGAN.

LOAD-SUSTAINING DEVICE.

1,209,746.   Specification of Letters Patent.   Patented Dec. 26, 1916.

Application filed May 27, 1916. Serial No. 100,175.

*To all whom it may concern:*

Be it known that I, WILLIAM H. MORSE, a citizen of the United States of America, residing at Detroit, in the county of Wayne and State of Michigan, have invented certain new and useful Improvements in Load-Sustaining Devices, of which the following is a specification, reference being had therein to the accompanying drawings.

My invention aims to provide a load sustaining device that can be advantageously used in connection with the chassis of the well known "Ford" automobile, when substituting a truck or commercial body for the ordinary pleasure or touring body, in order that the same chassis or running gear may be used for trucking or other commercial purposes. When making such a change, it is desirable to increase the strength or carrying qualities of the rear spring or springs of the automobile, to sustain such loads as the spring or springs may be subjected to.

My invention further aims to provide a load sustaining device consisting of comparatively few parts, inexpensive to manufacture, durable, easy to install, and highly efficient as a yieldable means for supporting a vehicle body.

My invention will be hereinafter specifically described and then claimed, and reference will now be had to the drawings, wherein—

Figure 1 is a rear elevation of a portion of an automobile chassis equipped with a load sustainer in accordance with this invention; Fig. 2 is an enlarged vertical sectional view of a portion of the load sustaining device; Fig. 3 is a horizontal sectional view taken on the line III—III of Fig. 2; Fig. 4 is an enlarged cross sectional view of the spring shackle bracket.

As illustrating the application of the load sustaining device, it is deemed only necessary to illustrate one of the devices, and it is to be understood that two of the devices are essential to insure an even balance and support for a body or body frame, relative to the rear axle of the vehicle.

In the drawing, 1 denotes a rear axle casing having a bracket 2 and pivotally connected to said bracket by a bolt or pin 3 is a shackle 4 supporting one end of a spring 5. The spring 5 is located above the rear axle casing 1 and said spring extends into a rear channel frame 6 adapted for supporting the rear end of a vehicle body.

The elements 1 to 6 inclusive are of a conventional form, for instance as forming part of a Ford chassis, and my load sustaining device is connected to the frame 6 and the bolt or pin 3 of the bracket 2, independent of the rear axle casing 1 and the spring 5. The load sustaining device comprises a channel arm 7 having the ends thereof flat with the inner end of the arm curved to extend upwardly into the frame 6, between the spring 5 and the top of the frame. This inner end is connected to the frame 6 by a hook or hanger bolt 8 constituting means for firmly securing the arm 7 relative to the frame 6.

The outer flat end of the arm 7 has an opening 9 and a socket 10, said socket having the walls thereof screwthreaded to receive the upper end of a cup or spring seat member 11. At the threaded end of the cup or member 11 there is a peripheral flange 12 which engages the bottom side of the arm 7, and the bottom of said cup or seat member has an opening 13 providing clearance for a guide rod 14. The lower end of the rod 14 is in screwthreaded engagement with a stirrup 15 which has apertured lugs 16 thereof held on the ends of the bolt or pin 3, as best shown in Fig. 4.

Encircling the rod 14 and the cup or member 11 is a coiled compression spring 17, said spring having the lower convolution thereof bearing upon the stirrup 15 and the upper convolution engaging the flange 12 of the cup or member 11. The expansive force of this spring holds the outer end of the arm 7 a prescribed distance above the stirrup 15, but permits of said arm lowering when the frame 6 is subjected to a load.

The upper end of the rod 14 has a retaining washer 18 and a nut or head 19. In the cup or member 11 and encircling the rod 14 between the washer 18 and the bottom of the cup or member 11 is a coiled compression spring 20 and this spring coöperates with the spring 17 to the extent of holding the rod 14 relative to the cup or member 11. The spring 20 also serves as a shock absorber by preventing a sudden rebound of the outer end of the arm 7 relative to the stirrup 15, and the device in its entirety has some of the prerequisites of a good shock absorber.

I attach considerable importance to the fact that the device may be easily and quickly installed without changing any part of the present Ford chassis, although in some instances it may be necessary to substitute a longer shackle bolt or pin 3 for what is ordinarily used. The disposal of the device does not interfere with brake band connections or parts of the rear axle casing, and while in the drawing there is illustrated a preferred embodiment of my invention, I would have it understood that the structural elements are susceptible to such changes as fall within the scope of the appended claims.

What I claim is:—

1. A load sustaining device comprising an arm adapted for attachment to a chassis frame to extend outwardly from the side thereof above a rear axle casing, a stirrup adapted for attachment to a spring shackle bracket, a cup connected to the outer end of said arm, a rod connected to said stirrup and extending through said cup, a spring between said stirrup and said arm, and a spring between said cup and the upper end of said rod.

2. A load sustaining device comprising an arm adapted to have the inner end thereof connected to a chassis frame, a stirrup adapted for attachment to a shackle bracket, a cup connected to the outer end of said arm, a rod connected to said stirrup and extending through said cup and the outer end of said arm, a spring around said rod and cup between said stirrup and said arm, a head on said rod, and a spring around said rod between said head and the bottom of said cup.

3. A load sustaining device comprising an arm adapted to have the inner end thereof extend between a body spring and a body frame and be connected to said frame, a stirrup adapted for attachment to a spring shackle bracket, a depending cup connected to the outer end of said arm, a rod connected to said stirrup and extending through said cup and the outer end of said arm, a spring around said rod between said stirrup and the upper end of said cup, a head on the upper end of said rod, and a spring in said cup between the bottom thereof and the head on said rod.

In testimony whereof I affix my signature in the presence of two witnesses.

WILLIAM H. MORSE.

Witnesses:
KARL H. BUTLER,
ANNA M. DORR.